No. 890,971. PATENTED JUNE 16, 1908.
O. H. ERICKSON.
SPEED REGULATOR FOR DYNAMOS.
APPLICATION FILED AUG. 3, 1907.

6 SHEETS—SHEET 1.

Witnesses:
Thos. Lagaard
H. A. Bowman

Inventor:
Otto H. Erickson.
By P. H. Gunckel
his Attorney.

No. 890,971. PATENTED JUNE 16, 1908.
O. H. ERICKSON.
SPEED REGULATOR FOR DYNAMOS.
APPLICATION FILED AUG. 3, 1907.

6 SHEETS—SHEET 2.

Fig 2

Witnesses:
Theo. Lagaard
H. A. Bowman

Inventor:
Otto H Erickson
By P. V. Gunckel
his Attorney.

No. 890,971. PATENTED JUNE 16, 1908.
O. H. ERICKSON.
SPEED REGULATOR FOR DYNAMOS.
APPLICATION FILED AUG. 3, 1907.

6 SHEETS—SHEET 3.

Witnesses:
Thro. Lagaard
H. A. Bowman

Inventor:
Otto H. Erickson
By P. H. Ginckel
his Attorney.

No. 890,971. PATENTED JUNE 16, 1908.
O. H. ERICKSON.
SPEED REGULATOR FOR DYNAMOS.
APPLICATION FILED AUG. 3, 1907.

6 SHEETS—SHEET 4.

Witnesses:
Theo. Laggard
H. A. Bowman

Inventor:
Otto H. Erickson
By P. H. Gunckel
his Attorney.

No. 890,971. PATENTED JUNE 16, 1908.
O. H. ERICKSON.
SPEED REGULATOR FOR DYNAMOS.
APPLICATION FILED AUG. 3, 1907.
6 SHEETS—SHEET 5.
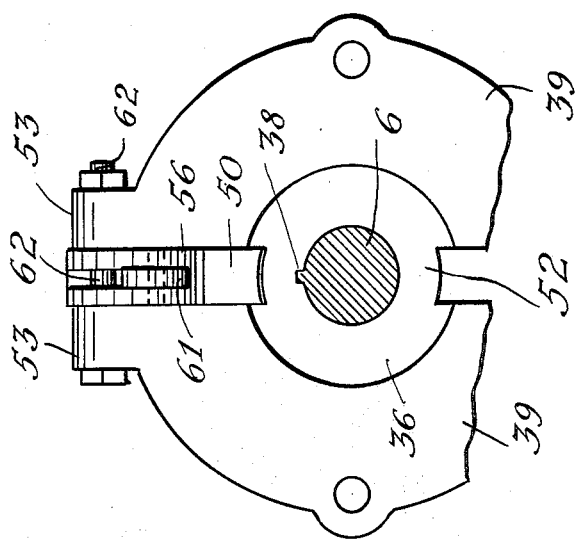
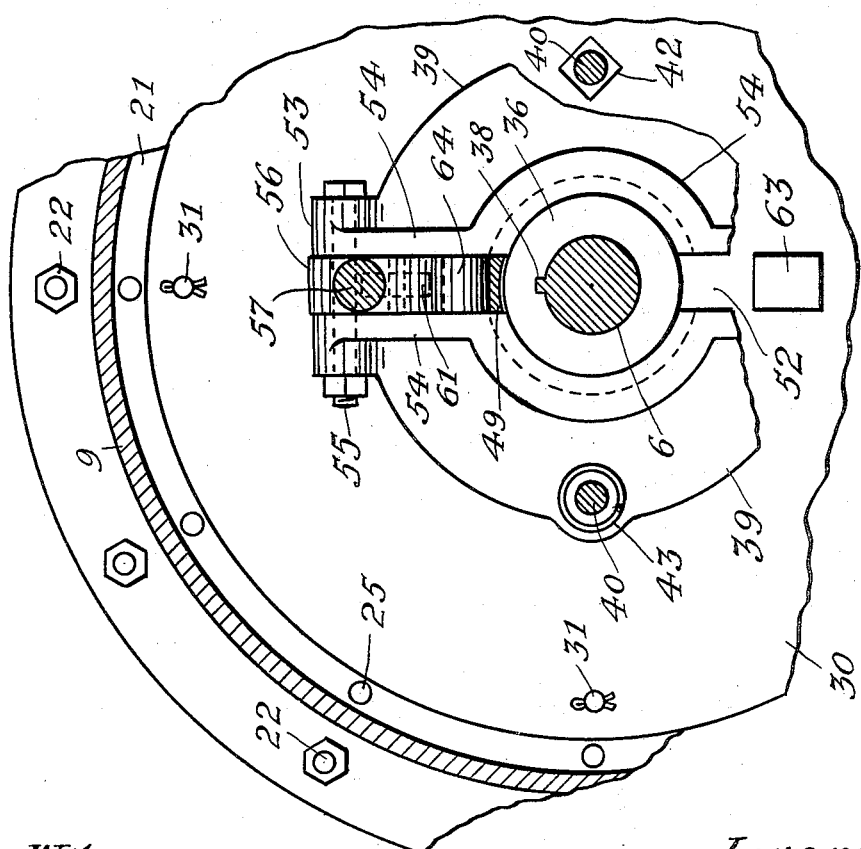
Witnesses:
Thro. Lagaard
H. A. Bowman
Inventor:
Otto H. Erickson.
By P. V. Gunckel
his Attorney.

No. 890,971. PATENTED JUNE 16, 1908.
O. H. ERICKSON.
SPEED REGULATOR FOR DYNAMOS.
APPLICATION FILED AUG. 3, 1907.

6 SHEETS—SHEET 6.

Witnesses:
Theo. Lagrard.
H. A. Bowman.

Inventor:
Otto H. Erickson.
By P. V. Gunckel
his Attorney

UNITED STATES PATENT OFFICE.

OTTO H. ERICKSON, OF MINNEAPOLIS, MINNESOTA.

SPEED-REGULATOR FOR DYNAMOS.

No. 890,971.　　　　Specification of Letters Patent.　　　Patented June 16, 1908.

Application filed August 3, 1907. Serial No. 386,862.

*To all whom it may concern:*

Be it known that I, OTTO H. ERICKSON, a subject of the King of Sweden, residing at Minneapolis, in the county of Hennepin and State of Minnesota, have invented certain new and useful Improvements in Speed-Regulators for Dynamos, of which the following is a specification.

My invention relates to devices for regulating the speed of dynamos, and particularly the speed of such as are driven by car-axles and the like.

The principal object of this invention is to prevent the operation of the dynamo at an unnecessary or undesirable speed; that is, at a speed above or below that at which the dynamo may work efficiently, to the end of avoiding unnecessary wear of parts.

My improvements, stated generally, consist in a regulator connected with the dynamo axis and a driving shaft to control and regulate the speed of the dynamo axis. But, as my improvements, are capable of use for other purposes than the regulation of the speed of dynamos, I do not wish to limit myself to their use in connection with dynamos or car axles.

Figure 1:
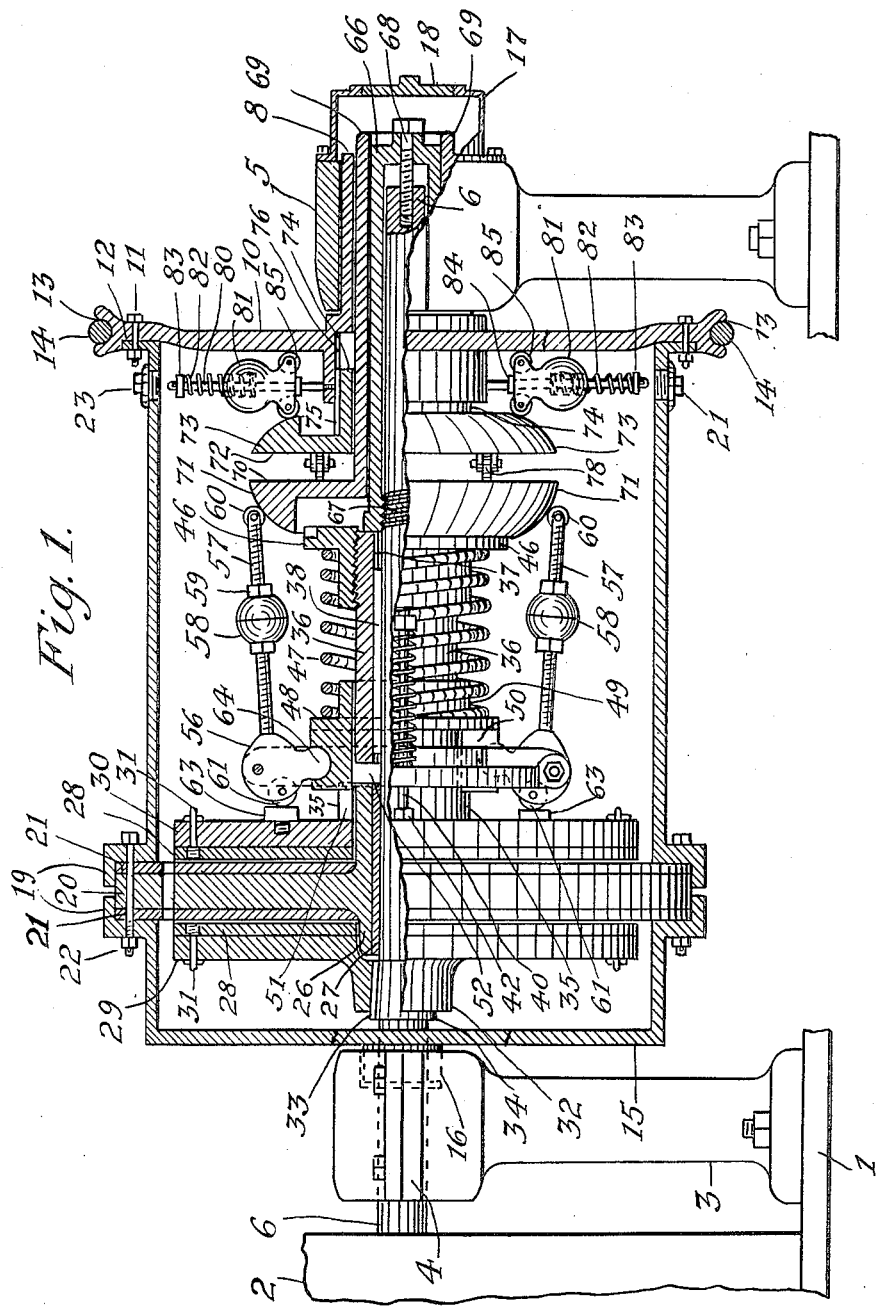
Figure 3:
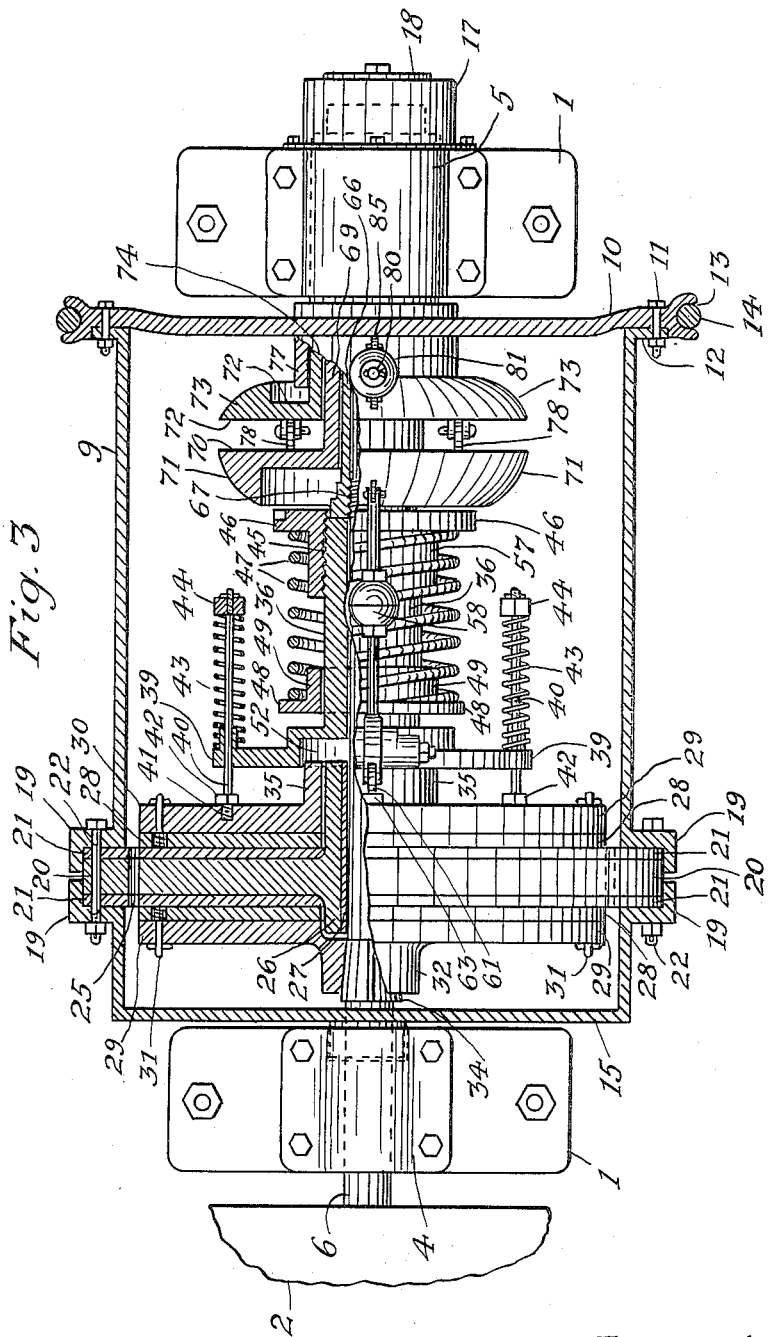
Figure 4:
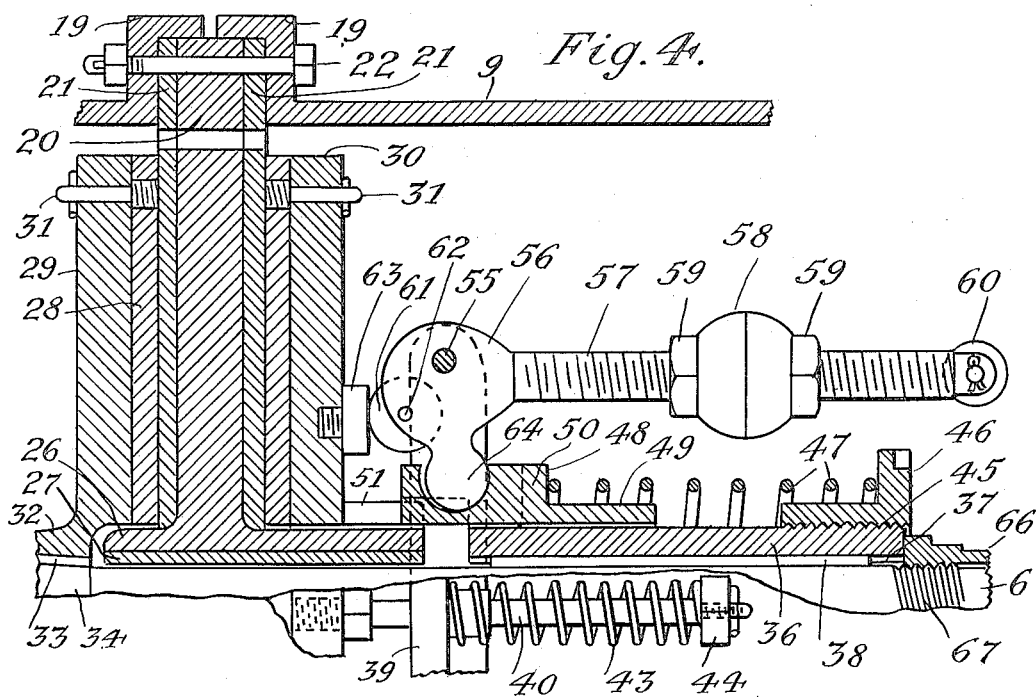
Figure 5:
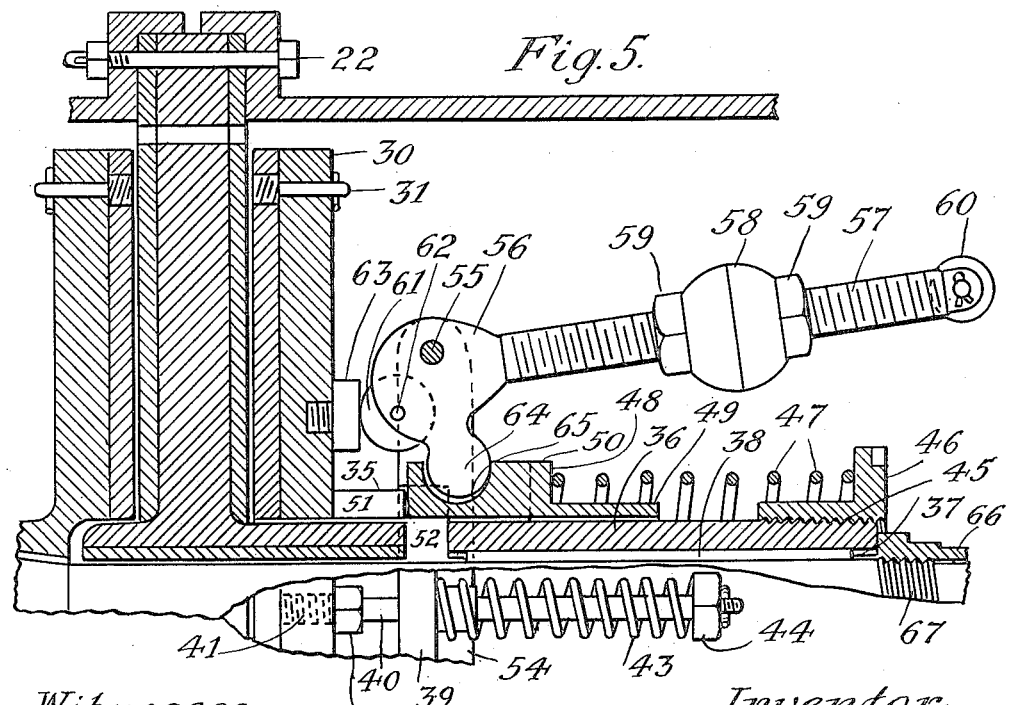
Figure 9:
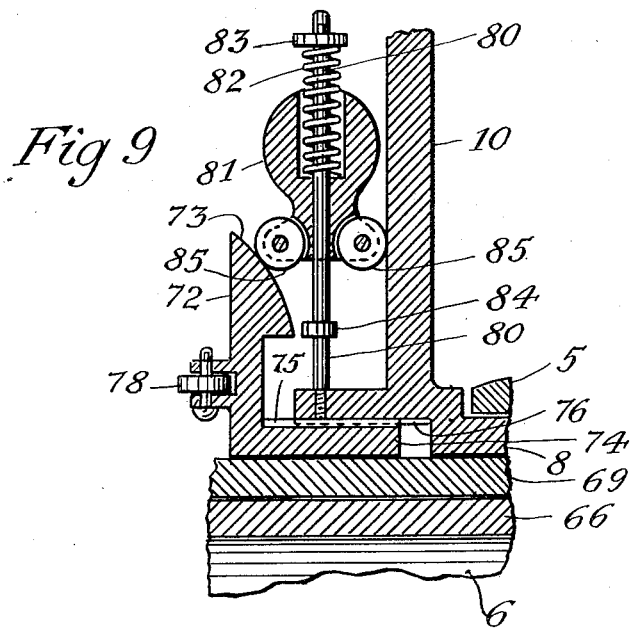
Figure 8:
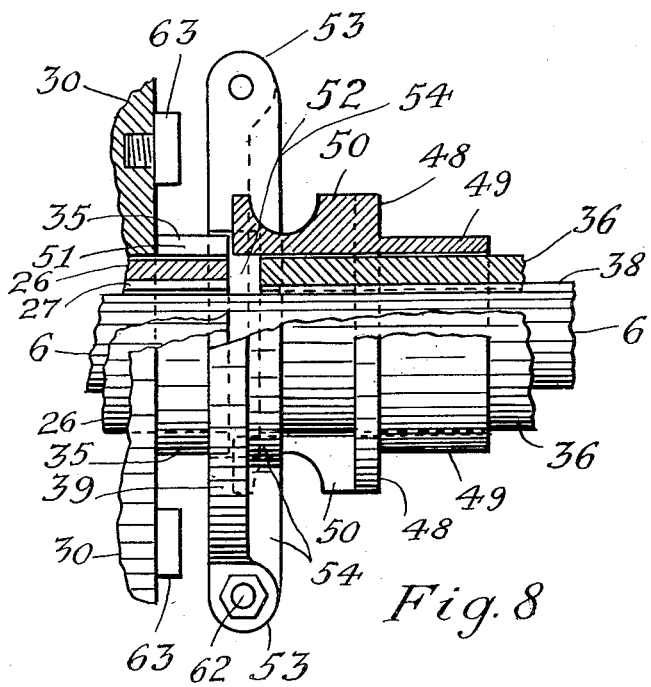

My improvements are illustrated in the accompanying drawings, in which—
Figure 1 is partly a side elevation and partly a vertical longitudinal section of my improved speed regulator showing the positions of the parts when at rest; Fig. 2 is a similar view showing the positions of the parts when in operation; Fig. 3 shows the same positions of parts as Fig. 2, partly in horizontal section and partly in plan view; and Figs. 4 to 9 are enlarged detail views of parts of the apparatus.
In the drawings 1 designates a suitable base or support for the dynamo casing 2 and the regulator devices; and the support may be attached to the truck-frame of a car, or to the frame structure of a machine. The regulator is attached by supports 3 to the base 1, and on the supports are provided suitable journal-boxes 4 and 5 for the shaft 6 that drives the dynamo and for the trunnions 7 and 8 of the regulator case 9. The outer head 10 of the casing, which is secured thereto by bolts 11 engaging a flange 12 thereon and is therefore removable, is provided with a circumferential groove 13 for receiving the band 14 that operatively connects the regu-
lator with a driving shaft or axle (not shown). The hollow trunnion 7 is formed on the fixed head 15 of the casing and rotates freely in a recess 16 in the box 4 and is loose on the shaft 6; while the trunnion 8 is formed on the removable casing head 10 and is journaled somewhat loosely in the box 5. A detachable cover 17 is bolted to the head of the journal-box 5 and is provided with a removable screw-cap 18, for affording access to the interior parts.

The case 9 is formed of two sections having angular circumferential flanges 19 between which is placed a disk 20 and friction-plates 21, and the flanges and disk and plates are united by bolts 22. A casing is thus formed that is dust-proof and adapted to contain oil; and openings, closed by screw-plugs 23, are provided for introducing and discharging the oil as desired. When in use sufficient oil 24 is kept in the casing to permit the rotating parts to be self-lubricating. Holes 25 at intervals in the disk 20 and plates 21 allow the oil to flow from one chamber into the other. The casing so constructed constitutes, in effect, the driver for the contained mechanism as well as for the shaft of the dynamo.

The disk 20 is formed on a hub 26, which is provided with a bushing 27 and runs loose on the shaft 6. At the sides of the interior portions of the friction-plates 21 are coöperating friction-plates 28, attached, respectively, to disks 29 and 30, by means of pins 31 which are screwed into the plates and extend through the disks and are held in place by cotters. The plates 21 and 28 are preferably brass; and they can be removed and replaced when too much worn.

The disk 29 has a boss 32 formed at the outer side around its central opening and serving to attach it by means of a key 33 to a tapering enlargement 34 of the shaft 6. So that, when the disk 29 is revolved by the frictional contact of the plate 21 it will serve to rotate the shaft 6 and thereby operate the dynamo.

The disk 30 is formed on the end of a hub 35 that loosely surrounds the hub 26. Adjacent to the ends of the hubs 26 and 35 is a relatively long sleeve 36 having a longitudinal groove 37 for loosely receiving a spline 38 on the shaft 6, whereby the sleeve is made slidable on, while it turns with, the shaft.

The portion of the sleeve 36 adjacent to the hubs 26 and 35 has a relatively wide circular flange 39. This flange is connected to the disk 30 by means of rods 40 that are screwed into the disk, at 41, and locked by nuts 42. The rods extend loosely through openings in the flange 39 and carry spiral springs 43 that exert pressure against the flange 39 and against nuts 44 on the threaded ends of the rods, and so tend to draw together the disk 30 and the flange 39. The other end portion of the sleeve 36 is threaded at 45 to receive a nut 46. A coil spring 47 surrounding the sleeve 36 bears against the shoulder of the nut 46 and against the flange 48 of a short sleeve 49 that loosely surrounds the sleeve 36. Lugs 50 extend from the flange 48 in axial direction through corresponding openings 51 and 52, respectively, provided in the hub 35 and plate or flange 39.

From opposite perimeters of the circular flange 39 project pairs of lugs 53, which are strengthened by reinforcing ribs 54, and between each pair of lugs is connected, by a fulcrum-pin 55, the flat base 56 of the shank of a governor 57. The shank of the governor is screw-threaded and carries an adjustable weight 58 which is held in place by lock-nuts 59; and on its extremity carries an antifriction wheel 60. The base-plate 56 is also provided with an antifriction wheel 61 which is pivoted on a pin 62 and contacts with a block 63 screwed onto the side of the disk 30. From the inner face of the governor base-plate 56 extends a nearly circular lug or head 64 that seats loosely in a corresponding socket 55 formed in the lug 50. From the foregoing it will be understood that the governors 57 serve to slide the sleeve 49 on the sleeve 36 toward the nut 46 and in opposition to the force of the spring 47, when they are swung outward, as from the position indicated in Fig. 4 to that indicated in Fig. 5.

On the outer end of the shaft 6 is a relatively long cap 66 the inner end of which abuts the end of the sleeve 36 and screws onto a threaded portion 67 of the shaft, for the purpose of limiting and regulating the extent of outward movement of the sleeve 36. A screw 68 entered through the cap 66 into the end of the shaft holds the cap in place.

Surrounding loosely the cap 66 is a sleeve 69 that has formed at right angles on its inner end a circular flange 70 having a beveled or rounded inward rim 71. Adjacent to the flange 70 is a similar flange 72 and rim 73 projecting from a loose sleeve 74, and the latter has a spline 75 that operates in a groove 76 in the inner hub portion 77 of the casing head 10. The sleeve 74 being thus connected to the inner hub 76 is rotated thereby. But the sleeve 69, being loose on the cap-sleeve 66, does not rotate. The flange 72, which rotates, is provided with antifriction wheels 78 which contact with the non-rotating flange 70, and permit the former to rotate freely without rotating the latter. The location of the beveled rim 71 is such that normally the rollers 60 on the ends of the governors 57 bear upon it.

On the hub 77 are secured at opposite sides radial rods 80 on which are sliding governor weights or bodies 81 and spiral springs 82 the inner ends of which seat in sockets in the weights and the outer ends of which bear against nuts 83 on the ends of the rods. On the rods are fixed collars 84 on a plane with the inner edge of the rounded rim 73 of the flange 72; and on the front and rear sides of the weights are antifriction wheels 85, one of which contacts with the rounded face 73 and the other with the case-head 10.

When the casing is at rest the weights 81 are pressed toward the axis by the force of the springs 82 and move the flanges 72 and 70 away from the head 10, and the parts are then in the positions indicated in Fig. 1; that is, in inoperative position, the friction plates 21 and 28 being out of contact with one another. And the power of the springs 82 should be great enough to overcome that of the spring 47 to a sufficient extent to slightly spread apart the governors 57, so that their rollers 60 will contact with an outer instead of an inner portion of the beveled rim 71, as shown in Fig. 1. When the case is then revolved the weights 81 gradually move outward against the resistance of the springs 82. Such movement of the weights or primary governors 81 frees the bevel rim 73 from the pressure of the wheels 85 and permits the expansive force of the spring 47 to slide the sleeve 49 inward and cause the governors 57 to move further toward the axis, as shown in Fig. 2; and this results in moving the friction plates to contact. As the speed of the revolving case is increased the dynamo governors 57 are caused to gradually swing outward, thereby reducing the pressure of the rollers 61 against the blocks 63 and thus gradually relieving the disk 30 from lateral pressure. This condition results in permitting the friction plates 28 to move laterally away from the friction plates 21, so that the former will then cease to be revolved by the latter plates.

In practice, let it be assumed that the dynamo is designed to produce the desired current when running at four hundred (400) revolutions per minute; that the governors 81 are adapted for maintaining contact with the base of the rim 73, as indicated in Fig. 1, until they have attained a speed of about three hundred and fifty (350) revolutions per minute; that the dynamo governors 57 are adjusted and adapted to maintain the positions shown in Fig. 2 until they have attained a speed of about four hundred (400) revolutions per minute; and that the devices are arranged in connection with a car axle. Before the car starts, the parts of the regulator will be in the relative positions indicated in Fig. 1, the friction plates being out of operative contact. When the car is started, the case 9, the parts 72, 73, and 74, and the governors 81 will be revolved; but the friction devices being out of contact, the shaft 6 will not be rotated. As the speed is increased and the governors 81 revolve at three hundred and fifty (350) or more revolutions per minute they will be moved outward and permit the pressure of the governors 57 on the rim 71 to move that member and the connected parts toward the casing head 10, and thus allow the expansive force of the spring 47 to move the friction plates 21 and 28 to operative contact, as indicated in Fig. 2, whereupon the shaft 6 will be rotated by reason of the connection with it of the disk 29.

The rotation of the shaft 6 will, because of the connection with it of the sleeve 36, start the revolution of the governors 57, but they will maintain the positions indicated in Fig. 2 until the speed of their revolution is slightly in excess of four hundred (400) per minute, when their centrifugal force will overcome the expansive force of the spring 47 and they will move outward sufficiently to relieve the friction plates of lateral pressure and allow them to separate and become temporarily inoperative. Thereupon, as is obvious, the speed of the shaft 6, if it has been increased slightly above four hundred (400) revolutions, will diminish and when it is at or about four hundred (400) the action of the spring 47 will again retract the governors and bring the friction devices into operative contact. Thus a speed of the shaft will be maintained at practically four hundred (400) revolutions per minute; or such other speed as the devices have been arranged to maintain.

To facilitate the operation of engaging and disengaging the friction devices, the case 9 is preferably made slidable to a limited extent with reference to the shaft 6, by having its trunnions 7 and 8 loose and capable of slight endwise movement in their respective journal-boxes 4 and 5 and the hub bushing 27 loose and slidable on the shaft. By this arrangement the spring pressure exerted by the governors on the plate 30 serves to move the disk 20 and friction plates 19 toward the disk 29, which is fixed on the shaft; and when the governor pressure upon the plate 30 is released the friction of the plate 19 carried by the revolving disk 20 upon the plate 28 attached to the disk 29 will cause the former to recede from the latter and slide the case correspondingly. In effect, these parts constitute a friction-clutch, in which the disk 29 is the fixed member and the disks 20 and 30 are the movable members and the governors 57 are the clutch-shifters, for transmitting motion from the case 9 to the shaft 6.

From the foregoing it will be understood that the governor devices 81 and their connections are provided solely for the purpose of preventing the rotation of the dynamo shaft until a speed of the casing approximating the desired speed of four hundred (400) revolutions per minute has been reached; and it should be understood that these devices may be entirely dispensed with in connection with the regulator, if it is desired to permit the shaft 6 to be rotated when the car starts and before the desired maximum of four hundred (400) revolutions has been attained. For, obviously, the governors 57 and their connections will perform their function of limiting the maximum speed without the aid of the governors 81 and their connections.

Having described my invention, what I claim and desire to secure by Letters Patent is—

1. In a speed regulator, a driven shaft, a friction-clutch member secured thereon, a driving clutch member, an inclosing revoluble and slidable case carrying the latter, and mechanism housed within the case for controlling the contact of the friction devices to regulate the speed of the shaft, substantially as set forth.

2. In a speed regulator, the combination with the driven shaft and a friction-clutch member fixed thereon, of a slidable driving friction member, a slidable inclosing case carrying the latter member, centrifugal shifter-levers and springs for controlling the driving member, and means for rotating said case, substantially as set forth.

3. In a speed regulator, the combination with the driven shaft and a friction-clutch member fixed thereon, of a slidable driving friction member, a slidable inclosing case carrying the latter member, centrifugal shifter-levers and springs for controlling the driving member, means for making the shifter-levers operative at selected speeds, and means for rotating and sliding such case, substantially as set forth.

4. In a speed regulator, the combination with the driven shaft and a friction-clutch member fixed thereon, of a slidable driving friction member, a slidable inclosing case carrying the latter member, centrifugal shifter-levers and springs for controlling the driving member, centrifugal governors for rendering the shifter-levers operative at selected speeds, and means for rotating and sliding such case, substantially as set forth.

5. In a speed regulator, the combination with a driven shaft, of a friction-clutch device comprising a case revoluble and slidable on the shaft and adapted to contain oil and providing a clutch member within and operated by the case, a second member fast on the shaft at one side of the rotating member, a slidable member at the opposite side of the latter member, and shifter-levers and springs for alternately controlling the positions of the slidable members, substantially as set forth.

6. In a speed regulator, the combination with the driven shaft and a friction-clutch member fixed thereon, of a slidable driving friction member, a slidable inclosing case carrying the latter member, adjustably weighted centrifugal shifter-levers and springs for controlling the driving member, and means for rotating said case, substantially as set forth.

7. In a speed regulator, the combination with a driven shaft, of a friction-clutch device comprising a case revoluble and slidable on the shaft and providing a clutch member within and operated by the case, a second member fast on the shaft at one side of the driving member, an independent slidable idle member at the opposite side thereof, centrifugal shifter-levers and springs for sliding said idle member, and loose sleeves on the shaft for carrying said idle member and levers and springs, substantially as set forth.

8. In a speed regulator, the combination with a driven shaft, of a friction-clutch device comprising a case revoluble and slidable on the shaft and providing a clutch member within and operated by the case, a second member fast on the shaft at one side of the driving member, an independent slidable idle member at the opposite side thereof, centrifugal shifter-levers and springs for sliding said idle member, loose sleeves on the shaft for carrying said idle member and levers and springs, and means for regulating the spring tension for controlling the effective operation of the shifter-levers, substantially as set forth.

9. In a speed regulator, the combination with the driven shaft, of a slidable oil-tight case thereon, means for revolving it around the shaft, a friction-clutch within the case and comprising a member rotated by the case, a second member fast on the shaft at one side of the rotating member, and a slidable member at the opposite side of the rotating member, centrifugal governors for releasing the members, and means for controlling the action of the governors, substantially as set forth.

10. In a speed regulator, the combination with the driven shaft, of a slidable oil-tight case thereon, means for revolving it around the shaft, a friction-clutch within the case and comprising a member rotated by the case, a second member fast on the shaft at one side of the rotating member, and a slidable member at the opposite side of the rotating member, centrifugal governors for releasing the friction members, a spring for actuating the governors to move the friction members to contact, and means for restraining such action until a predetermined speed of revolution has been attained, substantially as set forth.

11. In a speed regulator, the combination with the driven shaft, of a slidable oil-tight case thereon, means for revolving it around the shaft, a friction-clutch within the case and comprising a member rotated by the case, a second member fast on the shaft at one side of the rotating member, and a slidable member at the opposite side of the rotating member, centrifugal governors for releasing the friction members, a spring for actuating the governors to move the friction members to contact, and a second pair of spring-controlled governors carried by the case and devices controlled thereby for preventing the first-named governors from sliding the friction members to contact until a predetermined speed of revolution has been attained, substantially as set forth.

12. In a speed regulator, the combination with the driven shaft, of a slidable oil-tight case thereon, means for revolving it around the shaft, a friction-clutch within the case and comprising a member rotated by the case, a second member fast on the shaft at one side of the rotating member, and a slidable member at the opposite side of the rotating member, centrifugal governors for releasing the members, and means for adjusting the governor mechanisms to adapt them to be operative at selected speeds, substantially as set forth.

In testimony whereof I have signed my name to this specification in the presence of two subscribing witnesses this 19th day of July, 1907.

OTTO H. ERICKSON.

Witnesses:
P. H. GUNCKEL,
H. A. BOWMAN.